United States Patent [19]
Young

[15] 3,702,976
[45] Nov. 14, 1972

[54] ALL GLASS PERIPHERALLY MULTI-ARCUATE DISC LASER

[72] Inventor: Charles G. Young, Storrs, Conn.
[73] Assignee: American Optical Corporation, Southbridge, Mass.
[22] Filed: Nov. 11, 1971
[21] Appl. No.: 197,893

Related U.S. Application Data

[63] Continuation-in-part of Ser. No. 20,946, March 19, 1970.

[52] U.S. Cl.....................................331/94.5, 330/4.3
[51] Int. Cl................................................H01s 3/06
[58] Field of Search.........331/94.5; 330/4.3; 250/199

[56] References Cited

UNITED STATES PATENTS

| 3,487,330 | 12/1969 | Gudmundsen | 331/94.5 |
| 3,602,836 | 8/1971 | Young | 331/94.5 |
| 3,628,172 | 12/1971 | Matovich | 331/94.5 |

Primary Examiner—William L. Sikes
Attorney—William C. Nealon et al.

[57] ABSTRACT

A rectangular-disc laser structure of all-glass support construction. A segmented neodymium-doped glass laser rod is supported in a glass tubing and is designed to permit fluid coolant flow within the tubing and amongst the rod segments. The non-laserable glass supporting means consists of samarium-doped cladding glass to reduce interference by "off axis" spontaneously emitted light. The fluid coolant has an index of refraction which matches that of the laser glass to achieve a high efficiency. The absence of metallic supporting means minimizes the chance of metallic decomposition under the influence of pump light. A peripherally multi-arcuate laser structure utilizing a four-flashtube closewrap is disclosed where part of each flashtube water jacket surface mates with one of the multi-arcuate tubing surfaces.

7 Claims, 4 Drawing Figures

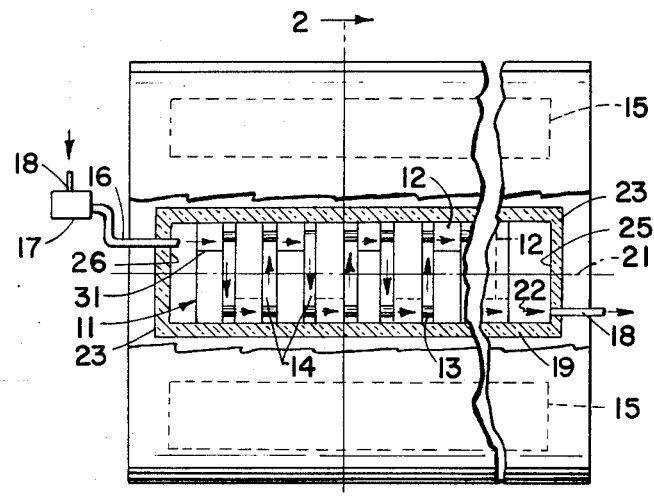
FIG. 1
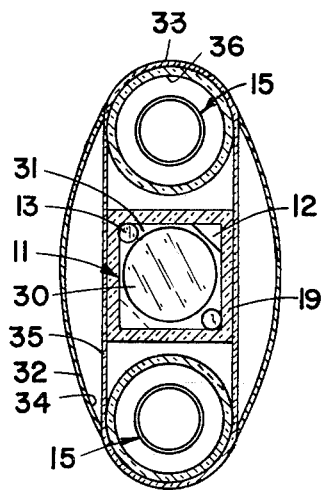
FIG. 2
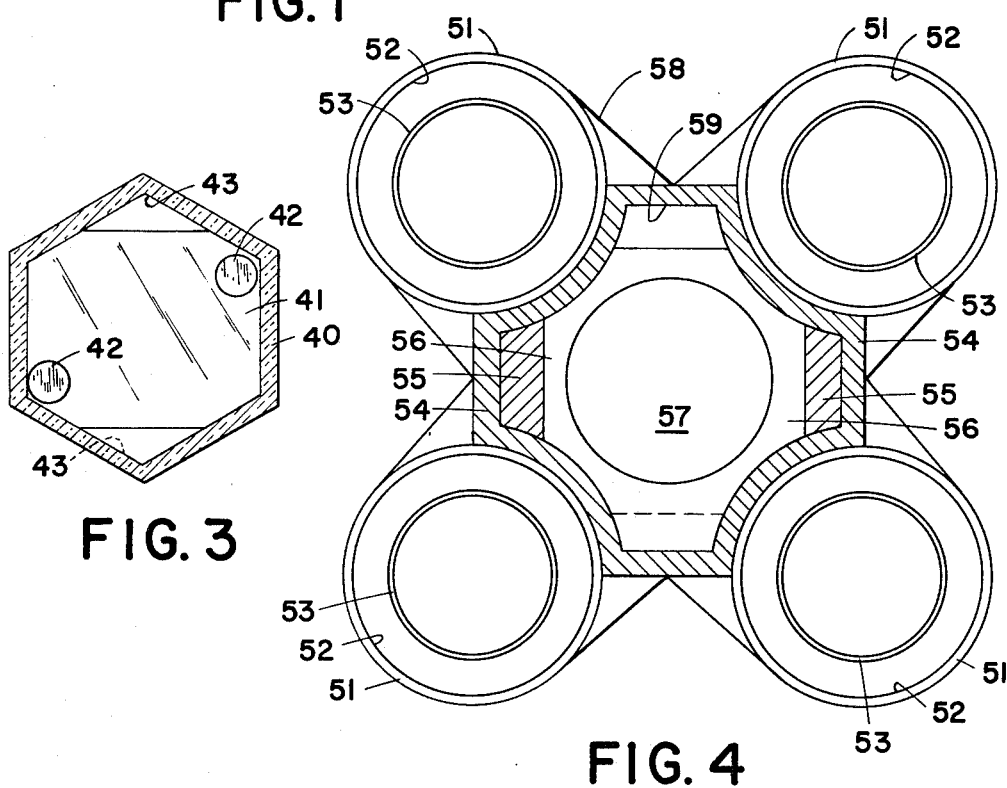
FIG. 3
FIG. 4

ALL GLASS PERIPHERALLY MULTI-ARCUATE DISC LASER

This patent application is a continuation in part of co-pending patent application Ser. No. 20,946 filed on Mar. 19, 1970.

BACKGROUND OF THE INVENTION

This patent application is a continuation in part of co-pending patent application Ser. No. 20,946 filed on Mar. 19, 1970.

The instant invention relates to glass lasers and, more particularly, to an all-glass multi-arcuate disc laser structure.

A laser (light amplification by stimulated emission of radiation) is a well-known device consisting of a rod of lasering material between parallel, end mirrors, one of which provides full reflection and the other partial reflection and partial transmission of light therethrough. Pump light is introduced into the laser material, generally normal to the longitudinal axis of the rod between the two end mirrors. The laser light energy is produced in the laser rod by photonic emission from active or high energy level ions in the body of the laser material, with the pump light increasing the number of ions from lower energy level to the upper energy level. The pumping light energy abnormally increases the upper level population of ions and concomitantly depletes the lower level population of ions creating an inversion of energy states. Some of the ions in the upper energy level undergo a spontaneous light emissive transmission to the lower level, and a portion of the spontaneously emissive light reflects back and forth between the mirrored surfaces stimulating similar light emissive transmissions from other upper level ions. As the stimulated emission reflects back and forth repeatedly through the rod a sufficiently high intensive pulse of laser light energy is emitted for transmission through the partially reflective surface.

There are various problems associated with producing a laser beam. The amount of pumping illumination required to produce laser action in neodymium glass is about 50 watts per cubic centimeter. This pumping light produces heat in the lasering material, as does operation at high repetition rates. Special precautions must be taken for removing this heat. It is known in the art that temperature rises in the lasering materials of glass must be kept uniform to within about 1°C. or less in order for the Fabry-Perot cavity amplification to take place without loss of efficiency.

When operating solid glass laser rods at high repetition rates two problems appear. First, the rod may exhibit a planar radial split or break when the surface tangential stress exceeds the tensile limit of the glass. The second problem area is that of change in index of refraction with temperature, and in the case of a cylindrical glass laser rod a strong positive lens effect under moderate average-power operating conditions.

For example, the changes in temperature in a non-segmented laser rod cause an unequal index of refraction radially in the rod because of the linear expansion of the material. These temperature changes together with the change of index of refraction with temperature at constant density, and stress-induced birefringence, produce an induced lens effect in the rod which is deleterious.

To solve the problems related to excessive heat in the solid laser rod, an initial approach to a solution was a longitudinal sectioning which yielded a bundle of fagot of smaller-diameter cylindrical laser rods. This approach allowed a considerable improvement in the attainable average power in the so-called long-pulse mode of operation, since self-focusing does not occur in this mode.

In the so-called Q-switched mode, however, thermal lensing is still a problem as well as damage at the output end edges of the rods. In addition, aligning the plurality of rods is difficult.

A better approach to the problem and that used in the present invention is to form a multi-arcuate disc laser wherein the cylindric rod is sectioned transversely into a number of discs. There are a number of advantages in doing this. First, the minimum dimension of each piece can be made small enough to eliminate thermal splitting. Second, the thermal gradient is now parallel rather than transverse to the laser beam so that thermal lensing is much reduced. Third, even for a given residual radial thermal gradient, and this can be further minimized by use of an edge cladding, the induced lens power is about an order of magnitude less than that for a rod. Fourth, the full aperture is usable, compared to the case of the fagot laser where such is not true, with no rod edges in the laser beam. Fifth, optical correction can be applied to each disc, if needed. Sixth, discs can be selected for their durability and composition as a function of axial position. Seventh, alignment problems are equivalent to those for a single rod and therefore simpler than for a fagot array. And finally, the multi-arcuate shape of the structure provides extremely close-wrap optical coupling between four pumping flashlamps and the laser discs.

As further background in this particular laser rod art I make reference to the segmented lasers of the type disclosed in my copending applications "Disc Laser Modification", Ser. No. 812,119 and "Disc Laser Variation", Ser. No. 809,641 assigned to the same assignee as that of the present invention.

The disc laser approach, however, has been found to have some limitations. Since the laser light passes through a considerable length of the cooling fluid, this fluid must be transparent and remain so during prolonged operation. In addition, inter-facial optical losses between the fluid and the discs should be no more than for a solid rod. Also, appropriate mounting means must be employed which will not compromise laser efficiency, robustness, reliability, etc.

One of the problems involved with disc lasers, and which my invention solve, is the efficiency loss resulting from support-metal decomposition under the influence of pump light. Pump light, for example, from a Xenon flash tube, is intense energy. This light will vaporize the metal which then condenses on relatively cooler objects in the vicinity. Metal deposition on the laser glass, flash tube reflectors and other internal parts decrease pumping efficiency, lasing efficiency, laser life, fluid transparency, and may cause blockage of coolant flow, and other problems.

A solution to the decomposition problem is to eliminate all metal parts which may come under the influence of pump light. This includes metal support or mounting devices holding individual discs. My invention provides means for supporting the discs in an all-glass construction. The glass is transparent to pump light and chemically inert to the chosen coolant. Properly selected glass does not decompose under the influence of pump light. My support arrangement does not compromise pumping efficiency, lasing efficiency, life or coolant flow.

Therefore, it is an object of my invention to provide an improved disc-laser structure.

An additional object of my invention is to provide a disc laser structure not subject to metal decomposition under the influence of pump light.

A further object my invention is to provide a peripherally multi-arcuate disc laser structure allowing four-flashtube closewrap.

BRIEF DESCRIPTION OF THE INVENTION

My invention relates to means for mounting discs of laser glass to form a laser device. The laser glass disc may be circumferentially encompassed by a cladding glass, (the circumferential glass need not be cladding glass), the periphery of which is multi-arcuate. The assembly of the two types of glass is termed a "plate" hereafter. One web, or portion of the cladding glass located between two adjacent flashtubes, contains an aperture, and the two webs adjacent thereto contain glass protuberances used for spacing between a first plate and a longitudinally adjacent one. The aperture is a conduit for coolant flow across faces of the discs in response to pumping and cooling means external to the laser device. The edges of the cladding bounding the aperture can be rounded to ensure smooth, laminar coolant flow.

The plates are held close-fitted within a glass tube. The tube is arranged to precisely align the plates along a common longitudinal axis. The plates have sufficient thickness to permit alignment by the tube. The plate orientation within the tube is such that the longitudinally adjacent plates have their apertures diagonally opposite each other, to provide a coolant flow path across the surface of each plate. Thus coolant flow is along a tortuous and generally unulating path. The coolant fluid is selected to have an index of refraction equal to that of the selected laser glass, for example, with neodymium-doped glass equal to 1.51 for optimum operation.

Flash tubes used to supply the pump light are each close-fitted and part of each flashtube water jacket surface is contiguous with one of the outside arcuate surfaces of the glass tubing. Therefore the flashtubes are separated by tubing wall thickness from the active laser medium.

DRAWINGS

FIG. 1 is a side elevation in partial section, partially broken away of an embodiment of my present invention viewed perpendicularly to the longitudinal axis.

FIG. 2 is a cross-sectional view of the arrangement of FIG. 1 taken along the line 2—2.

FIG. 3 is a view of an alternative embodiment.

FIG. 4 is diagrammatic end-view of the preferred embodiment of my present invention.

DETAILED DESCRIPTION

FIG. 1 is an embodiment of my invention. Glass laser plates 11 are aligned along longitudinal axis 21 by rectangular glass tubing 19 into which plates 11 are inserted in a close tolerance fit. Glass spacers 13 are raised from the surfaces of plates 11 along a longitudinal direction. The spacers abut adjacent plates 11 and thereby provide a space for coolant flow 22 between plates. Coolant flow 22 is controlled by a pump 17. Flow enters segmented laser device 23 via orifice 16 and exits via orifice 18 back to pump 17. Details of the pump and associated cooling equipment are shown schematically herein to maintain drawing simplicity. More detailed information may be found in U.S. Pat. No. 3,569,860 to Booth. Flow 22 within laser device 23 takes an undulating path through apertures 12 and spaces 14, to provide efficient cooling of plates 11. The fluid is chosen to have an index of refraction of approximately 1.51 to match that of the preferred approximately 2.4 percent by weight $Nd^{+++}$ doped laser glass for maximum efficiency. For the samarium glass I prefer approximately 10 percent by weight dopant. For further information regarding the samarium and neodymium glasses useable according to this invention, I make reference to U.S. Pat. No. 3,445,785 to Koester et al. assigned to the same assignee as that of the present invention.

Flash tubes 15 are parallel to the outer wall of glass tubing 19 and although only two flash tubes are shown, more may be used. Flash tubes 15 provide the necessary excitation energy to the laserable material. The lasering action takes place in a direction parallel to longitudinal axis 21. The two ends of the laser rod contain parallel mirrored surfaces 25 and 26, both mirrors being orthogonal to the longitudinal axis; one surface is completely reflective and the other is partly reflective and partly transmissive to allow the exiting of the laser beam. As is well understood, the mirrors reflect light energy back and forth through the laser structure to promote light amplification.

Laser disc 30 can be seen in FIG. 2 as a circle. The encompassing and supporting glass ring 31 is of samarium-doped glass. It absorbs any off-axis light rays which could interfere with the laser beam. An aperture 12 is formed through glass ring 31. Glass spacers 13 are shown in corners adjacent to the corner through which aperture 12 is formed. Water-cooled reflector 35 is provided which combined with wall 32 forms a conduit 34 for water coolant (not shown). Ultraviolet light absorbing glass flash tube water jacket 33 is provided which combines with the surface of the flash tube to form another conduit 36 for water coolant (not shown).

It is seen that glass support construction is used throughout. No metal parts are used internal to the glass tubing 19.

FIG. 3 is a view of an alternative embodiment of my present invention. Glass tubing 40 is hexagonal in cross-section and is composed of samarium-doped cladding glass. The tubing 40 serves two purposed herein: to absorb any off-axis light; and to channel the coolant flow. The hexagonal cross-section permits usage of a maximum of six flash tubes. Plate 41 is the laser material. Spacers 42 are also provided. It should be understood other polygonal and non-polygonal shapes may be used for tubings, if compatible plate cross-sections are used.

An example of a non-polygonal shape is shown in FIG. 4, where a four-flashtube closewrap structure is depicted. Laser disc 57 is seen as a circle and is equivalent to disc 30. Encompassing and supporting member 56 has a crosssectional shape determined by four peripheral non-intersecting arches with a "web" between adjacent arches, and member 56 is essentially equivalent to ring 31. Member 56 can be made of light-absorbing samarium doped glass or can be made from glass without dopant. Protuberances 55 are shown located at opposite webs of member 56. These protuberances or spacers are equivalent to glass spacers 13. Hollow tubing 54 in this embodiment has a four-arc shape. Multi-arcuate is intended to indicate that less than and more than four arcs may be used. Tubing 54 is arranged to internally precisely align members 56 and to externally mate and be contiguous with part of the outside surfaces of each of four flashtube water jackets 51 as shown. Flashtube 53 is surrounded by water coolant contained in conduit 52 between water jacket 51 and flashtube 53. Reflector 58 is arranged to reflect rearwardly-radiated light from each flashtube and to concentrate the light at laser discs 57. Aperture 59 is equivalent to aperture 12.

The operation of a laser system with this shaped structure is essentially equivalent to that described above, where the improvement of FIG. 4 provides at least a greater laser pumping efficiency. Thus, operative description will not be repeated here.

Tubing 54 can be precision bore tubing which is drawn over a mandrel, such as "TRUBORE." The outer dimension can be ground slightly for good fits. Member 56 can be cut octagonally and precision polished to create four arcuate shapes and to provide a good fit with flashtube water jacket 51. However, an initial octagonal cut is not necessary; the webs can be formed to extend between the flashtubes to a greater extent than that shown. Member 56 can be recessed at diametrically opposite webs to accept spacers 55. Spacers 55 might be glass or non-reactive plastic such as teflon or one of the RTV's. The latter would provide resilience in the presence of expansion of the structural pieces.

Disc 57 can be normal or at near Brewster's angle to the beam. In a particular instance, discs 57 can be a few millimeters thick with a few tenths of a millimeter spacing between discs. A typical flashtube, an EGG FX–67, has been used for which a diameter of 18 millimeters for disc 57 appears to be optimum.

It is to be understood that other laser materials can be utilized. Laser glass of dopants other than neodymium and coated laser glass can be employed.

It is to be further understood that the plates need not necessarily be aligned to form right angles with the longitudinal axis. For example, they could be aligned at the "Brewster's angle".

It is to be further understood that four flashlamps need not be used. Two or more flashlamps can be used with appropriate peripheral arcuate design. Also, the tubing need be doped and need not be glass;—the tubing could be plastic. If the tubing is doped glass, the dopant could be samarium or cerium.

From the embodiments of my invention disclosed herein, it is understood that other changes can be made without departing from the spirit and scope of the invention as defined by the appended claims.

What is claimed is:

1. A light-transparent laser structure comprising linear glass tubing of multi-arcuate crossection said tubing arranged to contain flow of a fluid, a plurality of glass plates, each of said plates containing at least a portion of laser material and being close fitted within the inside surface of said multi-arcuate tubing and arranged to span the hollow of said tubing, there being an aperture near an edge of each of said plates which are substantially equally spaced from each other, sequential plate apertures arranged to cause tortuous flow of said fluid through said tubing, said flow arranged to cool each of said plates, and a plurality of flashtubes externally adjacent said tubing, a portion of the surface of each of said flashtubes arranged to be fitted contiguously with a portion of the external surface of said multi-arcuate tubing for providing close-wrap, efficient, light energization to said plates.

2. A laser structure as recited in claim 1 wherein said plurality of flashtubes is four.

3. A laser structure as recited in claim 2 wherein each of said plates comprises a disc of laser glass and an apertured glass member having four webs, said member encompassing and supporting said disc within said tubing.

4. A laser structure as recited in claim 3 wherein said disc of laser glass is neodymium-doped glass.

5. A laser structure as recited in claim 1 wherein said tubing is samarium doped glass.

6. A laser structure as recited in claim 3 wherein said member is samarium doped glass.

7. A laser structure as recited in claim 1 wherein said fluid is a liquid with an index of refraction of approximately 1.51.

* * * * *